3,344,189
AMINO-FLUORENE-COMPOUNDS AND PROCESS FOR THE PREPARATION THEREOF
Chester Davis, 415 E. 5th St., Newport, Ky. 41071
No Drawing. Filed June 24, 1963, Ser. No. 290,256
6 Claims. (Cl. 260—576)

This invention is directed to a simple, low cost process for the direct conversion of arylmethane dyes into fluorene dye derivatives. The invention also relates to a valuable series of fluorene derivatives which are highly suitable for use as recording materials, dyeing agents, biological stains, and chemical intermediates. Still another aspect of this invention concerns a new reaction of arylmethane dye cations.

The basic arylmethane dyes have long been of commercial interest because of their extremely high color-intensity. The major factor which has prevented their use on a much larger scale than they have been used is their poor light-stability; as a class, they are among the most fugitive of the known dyes. The major market for certain members of this class is in applications where their poor light-stability is more than counter-balanced by their high color-intensity or special dye properties. What has long been desired for printing, coloring, and recording applications is a series of dyes possessing color-intensity and shade as good as those of the arylmethane dyes, but having a superior light-stability. Such dyes could be used to greater advantage than the arylmethanes in their present applications. This has now been made possible by an unexpected discovery by the present inventor.

In the course of another investigation, an attempt was made to obtain the phosphorylated derivative of Crystal Violet by condensing Crystal Violet Base with trimethyl phosphate under various reaction conditions. In an attempt to "force" the proposed condensation, the materials were dissolved in concentrated 66° Bé. sulfuric acid and the temperature of the solution was slowly raised to 100° C. As no evidence of a reaction was observed and as the dye showed no evidence of being destroyed (by being split to Michler's Ketone), the reaction was heated further until, at approximately 180–190° C., evidence of a reaction was observed. The solution was briefly heated to 205° C., cooled, and worked up. A large amount of dark product was obtained which proved to be neither the starting material nor the expected phosphorylated Crystal Violet.

Purification of this reaction product gave a white crystalline compound which was non-staining to skin and which did not color upon exposure to air. Strong oxidants converted the compound to an intense indigo-blue to deep violet color which was found to be very light-stable. The properties of this unknown material proved to be of such great value that work on phosphorylated Crystal Violet was discontinued in favor of the product obtained. Considerable difficulty was encountered in determining the structure of this material, which was assumed to be an unknown condensation product of Crystal Violet with trimethyl phosphate. Further runs gave a pale yellow crystalline product, melting point 225–226° C. (uncorrected), which gave a carbon-hydrogen-nitrogen analysis of $C_{26}H_{30}N_3$, indicating that an anthracene derivative had been formed. When triethyl phosphate was used in place of trimethyl phosphate, a slightly different product was isolated which was assigned a structure corresponding to 2,7-bis (dimethylamino)-9-methyl-10-p-dimethylaminophenyl anthracene; but a purified sample of this gave a carbon-hydrogen-nitrogen analysis indicating $C_{25}H_{30}N_3$ and a molecular weight of 356, indicating that no new carbon atom had been introduced.

Fuchsin dye gave with trimethyl phosphate in sulfuric acid a similar reaction; and the product from Fuchsin gave upon oxidation an indigo-blue dye, not magenta. The material appeared to be a sterically hindered leuco of a new ring structure. When Crystal Violet Chloride was dissolved in 66° Bé. sulfuric acid and the solution heated at 205–210° C. for fifteen minutes, the product of unknown structure, M.P. 223–225° C. (uncorrected) was isolated. As the ring formed in Fuchsin could not be formed by a rearranged N-methyl group, as might possibly be the case with Crystal Violet, the structure of the products obtained from this new reaction was then assumed to be a fluorene compound formed by a novel internal redox hydrogen transfer:

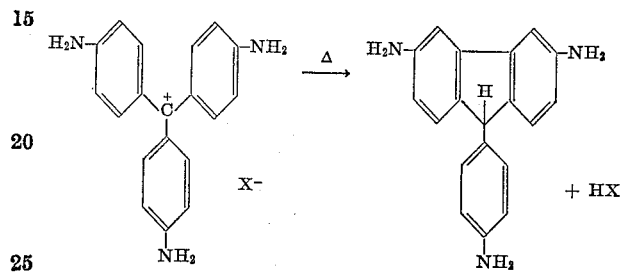

The product from Crystal Violet was then (correctly) assigned to the structure of 3,6-bis (dimethylamino)-9-p-dimethylaminophenylfluorene. The analytical data (calc.: carbon 80.82%, hydrogen 7.87%, nitrogen 11.31%, molecular weight 371.5; found: carbon 80.87%, hydrogen 8.03%, nitrogen 11.18%, molecular weight 356) was in excellent agreement. When all of the experimental work was completed, a spectra determination confirmed the presence of a fluorene ring.

Extensive experimental work indicated that this unexpected ring-forming reaction was a new, hitherto unsuspected, reaction of basic aminoarylmethane dyes. Apparently merely heating the dye in concentrated sulfuric acid aromatized the arylmethane dye by ring closure to yield a fluorene leuco; however, yields of purified material varied considerably. Despite the fact that conversion of arylmethane dye appeared complete after short heating intervals, the products obtained always contained large amounts of toluene-insoluble products. Fuchsin upon short heating in concentrated sulfuric acid containing no trimethyl phosphate gave a product which was complete insoluble in toluene and in glacial acetic acid; this could not be the fluorene leuco previously obtained.

A sample of Methyl Violet dye heated in sulfuric acid only all of the Methyl Violet dye disappeared gave about 20% of fluorene dye leuco and about 80% of toluene-insoluble material. When this "by-product" was found to be capable of conversion to the desired fluorene dye leuco and, at the same time, the product from Victoria Blue was found to be slightly alkali-soluble, the exact mechanism of the new reaction suddenly became clear. The water-insoluble, toluene-insoluble products previously obtained from Fuchsin, Michler's Hydrol, Crystal Violet, and Methyl Violet were all fluorene leucosulfonic acids; and the mechanism of the process could be formulated as follows.

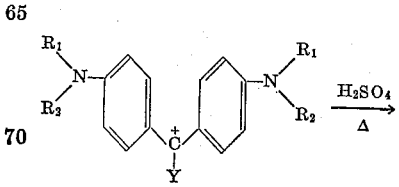

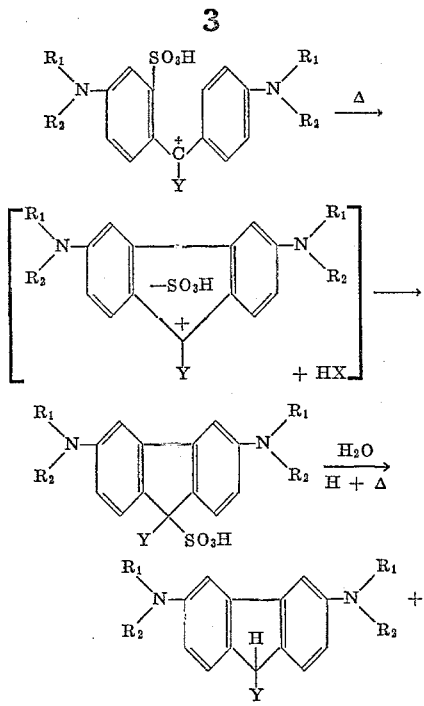

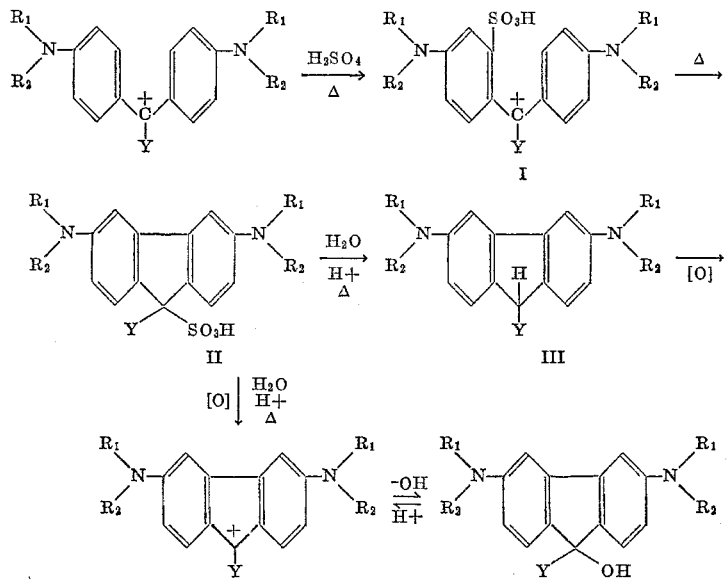

positions of marked commercial value. These new printing compositions and recording systems will be described in detail in a separate application.

The new process has proved to be an excellent method for obtaining certain fluorene compounds, such as the 3,6 - diamino - 9 - p-aminophenylfluorene from Fuchsin, which are not directly obtainable by any other known commercial method. The dyes and leucos prepared by this method are highly pure structures. It has long been known that small amounts of impurities can promote inferior light-stability and render a commercially prepared dye quite fugitive. One great value of the present process is that the dyes and leucos obtained through this process are free from impurities which cause poor light-fastness and they give markedly superior light-stable colors when properly developed. The purity of the structures obtained by the process of the present invention are of significant value and contribute much to the commercial worth of the fluorine derivatives thus prepared.

As the materials prepared by the process of the present invention are inexpensive and easy to manufacture, light-stable when properly developed, of high color intensity and deep shade, they represent a significant advance over the commercially avaiable arylmethane dyes.

Description

The preparative process of the present invention is represented by the overall reaction scheme:

This mechanism explains all of the experimental data, and the proposed fluorene leucosulfonic acid intermediate was isolatable in every case examined. According to this mechanism, the presence of additional water in the reaction medium should increase the yield of "hydrolysis" product; this was experimentally found to be the case. The transient 2-sulfonated dye could also be detected. In view of the intially good yields obtained when phosphorous compounds were present in the reaction medium, the role of ordinary phosphate ion was investigated. Experimental studies indicated that phosphate ion slowed down the rate of formation of fluorene leucosulfonic acid but speeded up the rate of hydrolysis of fluorene leucosulfonic acid to fluorene leuco and dye. As the result of further experimentation, a process was developed whereby excellent yields of fluorene dye leucos were obtained directly from arylmethane starting materials or from fluoroene leucosulfonic acid intermediates. This process is described fully hereinafter.

The materials derived by the process I have discovered can be made at low cost in a high degree of purity. They have been found to have properties superior to those of arylmethane types and to give printing and dyeing com- The starting material I is an arylmethane dye cation in sulfuric acid. $R_1$ and $R_2$ may be hydrogen or a lower alkyl group, and Y may be hydrogen, a lower alkyl group, or an aminoaryl group. Any aminoarylmethane dye derivative (dye salt, dye base, or dissociatatable complex) which yields the arylmethane cation I upon solution in sulfuric acid may be used as the starting material in the process of the present invention. For a one-stage process, the sulfuric acid solution used should have a water-content of less than 25%; 10–15% is preferred for rapid reaction purposes. A small amount of phosphate ion or other catalyst may be added to speed up the hydrolysis reaction if desired, or the reaction mixture without additives may be heated for somewhat longer periods of time.

The overall reaction does not take place below approximately 150° C. and proceeds in most cases at a rapid rate only above 170–175° C. For rapid throughput, temperatures above 190° C. are preferred; the formation of fluorene leucosulfonic acid above this temperature goes with remarkable speed.

As the reaction is essentially independent of dye concentration, this factor is not critical; however, for economic reasons, a dye concentration of 10–15% (or higher) is preferred. The economic reason for this will be apparent when it is realized that, at the present time, sulfuric acid costs about a penny a pound. A 15% dye–85% acid concentration adds only approximately 6¢/pound of dye converted to the cost of dye due to the amount of acid used; at 10% dye–90% acid, the acid cost is approximately 9¢/pound of dye converted; but at 1% dye–99% acid, the material cost for the acid used is 99¢/pound of dye converted. The base used to neutralize the acid is, after the cost of the dye itself, the major material cost of the process. In other words, solely for economic reasons rather than for reasons of basic process requirements, a high reaction temperature and high dye concentration are preferred.

It is usually cheaper to run the process in one continuous operation without isolating the intermediate structures; but if desired, one can isolate any of the stable intermediates, such as the fluorene leucosulfonic acid or the fluorene leuco, then convert this to the next product in a separate operation. Variations in the process conditions will be readily obvious to those skilled in the art by an examination of the specific examples given below.

EXAMPLE 1

The original method of preparation developed before the mechanism of the process was discovered will be described here for comparison with the improved process.

200 grams of Crystal Violet Base were dissolved in 1000 ml. (1840 grams) of 66° Bé. sulfuric acid, and 71 grams of trimethyl phosphate (Ethyl Corp.) were added. The solution was heated to 195° C. and held at 190–200° C. for 15–20 minutes (until a probe revealed that all Crystal Violet Dye had reacted). The reaction mixture was cooled, poured onto ice, and the acid was neutralized with aqueous ammonia. The resultant precipitate was filtered off and washed well with water, partially dried, and then extracted with 1300 ml. of boiling n-propanol to remove the fluorene dye formed in the reaction (the leuco is insoluble in alcohol). The dark blue powder remaining weighed 151 grams after drying. Recrystallization of this from hot toluene gave a total recovery of 78 grams of 3,6-bis (dimethylamino)-9-p-dimethylaminophenylfluorene (for convenience, this will hereafter be referred to as Hexamethyl Fluorene Violet Leuco). The toluene-insoluble remainder (70 grams) proved to be Hexamethyl Fluorene Violet Leucosulfonic Acid. The amount of oxidized leuco (Hexamethyl Fluorene Violet Base) recovered from the alcohol extract was approximately 25 grams.

EXAMPLE 2

An example of the preparation run without trimethyl phosphate before the exact mechanism of the process was discovered will be given here for comparison with the improved process.

412 grams of Methyl Violet Base were dissolved in 1600 ml. of 66° Bé. sulfuric acid and heated at 190° C. for 15 minutes (the reaction was noticeable at approximately 180° C.). The reaction mixture was cooled, poured onto ice, and the acid was partially neutralized with aqueous ammonia. Sodium dithionite was then added to reduce any fluorene dye formed back to the leuco, and the remaining acid was then neutralized with ammonia. The precipitate was filtered off, washed well with water, and dried to give 384 grams of dry solid. Extraction of this gave about 90 grams of 3,6-bis (dimethylamino)-9-p-methylaminophenylfluorene (Pentamethyl Fluorene Violet Leuco), melting point about 209° C. The toluene-insoluble fraction proved to be Pentamethyl Fluorene Violet Leucosulfonate.

EXAMPLE 3

114 grams of Crystal Violet dye were added in portions to a solution prepared by adding 500 ml. of 66° Bé. sulfuric acid to 50 ml. of water (to give a total water content of approximately 12%). Hydrochloric acid fumes were evolved and the solution foamed vigorously. Two grams of sodium triphosphate were added, and the reaction mixture was heated at 205–210° C. for over 30 minutes. The reaction mixture was then cooled, poured onto ice, and the acid was partially neutralized with aqueous ammonia. Sodium dithionite was added to reduce any fluorene dye to the leuco and the remaining acid was then neutralized with ammonia. The precipitate was filtered off, washed well with water and dried to give a pale blue powder which was almost completely soluble in hot toluene, leaving merely a trace of toluene-insoluble residue. The hot toluene solution was treated with a decolorizing clay, filtered, and cooled to give pale yellow crystals of Hexamethyl Fluorene Violet Leuco. Evaporation of the toluene gave a second crop, for a total yield of 90%.

The leuco was oxidized with lead peroxide in glacial acetic acid, sulfuric acid was then added, and the solution was allowed to stand for four hours before filtering off the lead sulfate (the oxidation does not seem to be instantaneous as in the case of leuco Crystal Violet). The resultant Hexamethyl Fluorene Violet Base was precipitated out with sodium hydroxide solution. This dyes textiles an indigo-blue color. It strongly stains skin, but not as permanently as Crystal Violet. It is somewhat less basic than Crystal Violet Base but forms a stable acetate and an easily crystallized chloride.

EXAMPLE 4

213 grams of Crystal Violet dye were added in portions to a solution prepared by adding 750 ml. of 66° Bé. sulfuric acid to 150 ml. of water (to give a total water content of approximately 16%). Three ml. of 85% phosphoric acid were added, and the solution was slowly heated to 205° C. Some water and hydrochloric acid began boiling off at about 175–190° C. After 15 minutes at 205° C. the solution was raised to 210° C. and held at 210° C. for another 20 minutes. The reaction mixture was then cooled, poured onto ice, and any fluorene dye formed reduced to the leuco with sodium dithionite. The acid was neutralized with caustic soda solution, and the precipitate filtered off and washed well with water. Recrystallization of the material from toluene and recovery of the toluene-soluble portion gave a total yield of Hexamethyl Fluorene Violet Leuco of about 92%.

EXAMPLE 5

128 grams of Fuchsin dye (Standard Ultramarine) were added in portions to a solution prepared by adding 600 ml. of 66° Bé. sulfuric acid to 50 ml. of water (to give a water content of almost 11%). Three grams of sodium triphosphate were added, and the reaction mixture was heated to 205° C. and held at 205–210° C. for fifty minutes. The solution was cooled, poured onto ice, and the acid was partially neutralized with ammonia. Sodium dithionite (zinc dust and other strong reducing agents can also be used, if desired) was added to reduce any fluorene dye formed back to the leuco. The remaining acid was then neutralized with ammonia. The precipitate was filtered off, washed well with water, and dried. The yield of 3,6-diamino-9-p-aminophenylfluorene (Fluorene Violet Leuco) was 75%; some leucosulfonate was still present.

Fluorene Violet Leuco has value as a chemical intermediate because of the presence of three reactive primary amino groups in the molecule. The Fluorene Violet Leuco was oxidized in hot glacial acetic acid solution by chloranil to give an indigo-blue dye, which is a somewhat purer indigo shade than is Hexamethyl Fluorene Violet dye. Fluorene Violet dye is considerably less basic than the Hexamethyl and Pentamethyl Fluorene Violet dyes and does not strongly stain the skin as they do; for this reason it has value as a selective biological stain.

EXAMPLE 6

156 grams of Fuchsin dye (Standard Ultramarine) were dissolved in 1000 ml. of 66° Bé. sulfuric acid. The solution was heated to 205° C. and held at 205° C. for fifteen minutes, cooled, poured onto ice, and the acid neutralized with ammonia. The precipitate was washed well with water and dried to give a pale violet powder (122 grams). This was the leucosulfonic acid: 3,6-diamino-9-p-aminophenylfluorenesulfonic acid-9. This material has no definite melting point. It is insoluble in water, toluene, and glacial acetic acid. Hydrolysis of this in sulfonic acid containing 12% water and a small amount of phosphate ion for one hour at 205–210° C. gave the leuco in 75% yield.

EXAMPLE 7

50 grams of ethyl hydrol-sodium bisulfite addition product were added to 270 ml. of hot (80° C.) 66° Bé. sulfuric acid. Sulfur dioxide was immediately evolved. The solution was heated at 205° C. for 25–30 minutes, cooled, and worked up in the manner previously described. The product first obtained upon precipitation was a low-melting solid with an amine-like trace odor; this was redissolved in dilute hydrochloric acid, filtered, and after adding ice the 3,6-bis (diethylamino) fluorene was precipitated with cold ammonia. This material is very soluble in cold toluene. The yield was 70%.

EXAMPLE 8

25 grams of 4,4'-diaminobenzhydrol (this was prepared by treating p,p'-methylenedianiline in hot glacial acetic acid with an acetic acid slurry of the calculated amount of finely powdered chloranil. A complex of the oxidation product with tetrachlorohydroquinone was immediately formed, and the solution became a thick paste. The acetic acid was removed, and the dry solid was treated with aqueous hydrochloric acid to dissolve the 4,4'-diaminobenzhydrol from the tetrachlorohydroquinone. The 4,4'-diaminobenzhydrol was then precipitated with ammonia as an orange red powder then dissolved in 140 ml. of 66° Bé. sulfuric acid, and the solution was heated at 200° C. for fifteen minutes. The solution was cooled, poured onto ice, and the acid was neutralized with ammonia. The product, after filtering off, washing and drying was almost pure 3,6-diaminofluorenesulfonic acid-9. This has no definite melting point and is insoluble in toluene. Hydrolysis gives 3,6-diaminofluorene, which is of value as an intermediate and for use in chemical systems.

EXAMPLE 9

207 grams of Ethyl Violet dye were added in portions to a solution prepared by adding 1000 ml. of 66° Bé. sulfuric acid to 100 ml. of water. Four ml. of 85% phosphoric acid were added, and the solution was heated at 200–205° C. for 30 minutes. The solution was cooled, poured onto ice, and sodium dithionite was added to reduce any fluorene dye formed back to the leuco. Ice was added, and the cold solution was then made neutral with ammonia. The precipitate was filtered off, washed with water, and dried to give an 80% yield of 3,6-bis (diethylamino) - 9 - p - diethylaminophenylfluorene (Hexa - ethyl Fluorene Violet Leuco). This material is very soluble in cold toluene, xylene, and other aromatic solvents. Oxidation with lead peroxide and with chloranil in glacial acetic acid gave the dye, Hexaethyl Fluorene Violet, which dyes wool and indigo-blue color.

EXAMPLE 10

213 grams of Michler's Hydrol were dissolved in 1000 ml. of 66° Bé. sulfuric acid, and the solution was heated to 190° C. (the reaction became noticeable at 160–170° C.). The reaction mixture was held at 190–195° C. for fifteen minutes, then cooled, poured onto ice; and the acid was neutralized with ammonia. The brown precipitate was filtered off, washed with water, and dried to give a 90% yield of 3,6-bis (dimethylamino)-fluorenesulfonic acid-9. The material has no definite melting point and is insoluble in water and toluene. It is useful as an intermediate in making other fluorene dyes.

EXAMPLE 11

170 grams of Michler's Hydrol (4,4'-bis (dimethylamino) benzhydrol) were dissolved in a solution prepared by adding 700 ml. of 66° Bé. sulfuric acid to 50 ml. of water (to give a water content of about 12.5%). Four ml. of 85% phosphoric acid were added, and the solution was slowly heated to 190° C. and held at 190° C. for ten minutes, then at 205° C. for fifteen minutes, then at 210° C. for fifteen minutes. The solution was cooled, poured onto ice, and the acid was neutralized with ammonia. As the precipitate was somewhat gummy, it was redissolved in dilute aqueous hydrochloric acid, filtered and ice was added; the desired 3,6-bis (dimethylamino) fluorene was precipitated as a fine powder by the addition of cold ammonia. The yeld was 80%. This material may be oxidized to 3,6-bis (dimethylamino) fluorene-ol-9, which is a very weak base, much weaker than Michler's Hydrol. The base does not stain skin and does not form a stable acetate dye salt in acetic acid as does Michler's Hydrol.

EXAMPLE 12

148 grams of Methyl Violet Base (Methyl Violet is chiefly pentamethylrosaniline but contains hexamethyl and tetramethylrosanilines) were dissolved in a solution prepared by adding 1362 grams of 66° Bé. sulfuric acid to 75 grams of water (to give a water content of 12%). Four ml. of 85% phosphoric acid was added, and the reaction mixture was heated at 205–210° C. for fifty minutes, cooled, and poured onto ice. Sodium dithionite was added to reduce any fluorene dye formed back to the leuco, and the acid was neutralized with ammonia. The precipitate was filtered off and dried. Recrystallization from hot toluene gave 3,6-bis (dimethylamino)-9-p-methylaminophenylfluorene. Evaporation of the toluene gave a second crop, for a total yield of 90%.

Pentamethyl Fluorene Violet Leuco from Methyl Violet differs from the Hexamethyl Fluorene Violet from Crystal Violet because of the presence of a secondary amino group in the molecule. Pentamethyl Fluorene Violet may react, for example, with benzyl chloride to give the N-benzylated derivative and also with nitrous acid. The product obtained above has a lower melting point and a higher solubility in cold toluene than the Hexamethyl product from Crystal Violet. Oxidation of the Pentamethyl Fluorene Violet Leuco derived from Methyl Violet dye gives an indigo-blue dye which dyes wool an indigo-blue color. The presence of a secondary amino group in this dye gives rise to somewhat different dyeing properties compared to Hexamethyl Fluorene Violet dye, and the resultant dye as obtained by the process of the present invention has certain commercial advantages over the Hexamethyl Fluorene Violet from Crystal Violet. They are not simple homologs but different chemical variations of the parent structure.

The fluorene leucosulfonic acid intermediates of the present process are all new compositions of matter with somewhat unexpected chemical properties. The structure of these materials is a salt-like zwitterion, which accounts for the indefinite, high sintering point of members of this series. They are water-insoluble and toluene-insoluble. The basicity of the amino groups present in these fluorene-leucosulfonic acids is considerably weaker than those in the corresponding leucos. The fluoreneleucosulfonic acids hydrolyze to the leuco rather than to the expected carbinol. The reason for this is apparently the fact that the carbinol in acid is a strong acceptor for the bisulfite ion which would be generated by such an hydrolysis; hydrolysis to the leuco and sulfuric acid is irreversible. In the presence of an oxidant, the dye is formed, apparently because the bisulfite ion generated here is oxidized to the bisulfate ion.

The process as disclosed is a general method for converting aminoarylmethane dye cations represented by Structure I into aminofluorene leucosulfonic acids represented by Structure II, then into fluorene leucos represented by Structure III. These leucos may then be converted into the dyes and dye bases.

Possible variations on the conditions of the process disclosed will be obvious to those skilled in the art; and the invention should not be considered confined to the reaction conditions and concentrations listed in the examples cited. The scheme of the process readily indicates that one may start at any stage of the process and finish up with either fluorene leucosulfonic acid, fluorene leuco, fluorene dye, or fluorene dye base.

What is claimed is:

1. The fluorene dye leucos represented by the following structure:

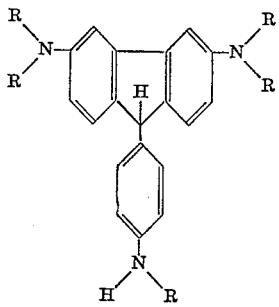

where R is selected from the group consisting of hydrogen and the lower alkyl groups.

2. The fluorene dye leuco represented by the following structure:

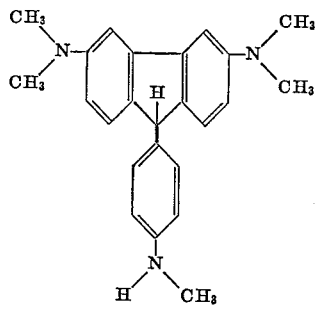

3. The fluorene dye leuco represented by the following structure:

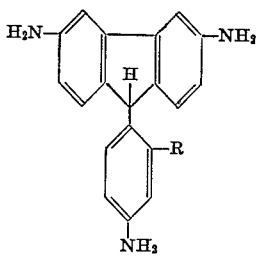

where R is selected from the class consisting of hydrogen and lower alkyl.

4. The process for preparing fluorene dye leucos represented by the following structure:

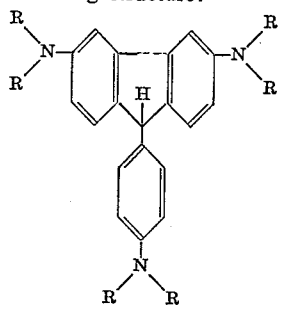

where R is selected from the group consisting of hydrogen and the lower alkyl groups, which consists essentially of heating an arylmethane dye cation represented by the following structure:

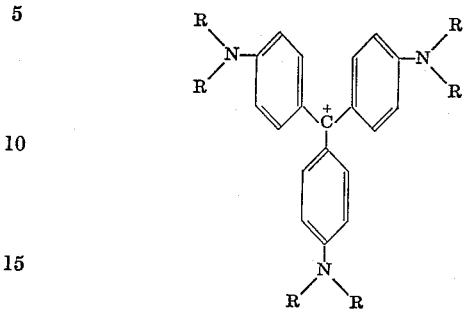

where R is selected from the group consisting of hydrogen and lower alkyl groups, in sulfuric acid containing not more than about 25% water to temperatures over about 150° C., and holding until conversion is essentially complete.

5. The process for preparing fluorene leucos represented by the following structure:

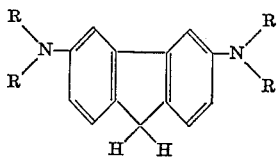

where R is a member of the group consisting of hydrogen and lower alkyl groups, which consists essentially of heating an arylmethane cation represented by the following structure:

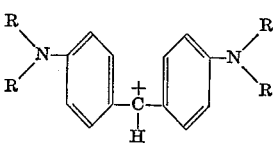

where R is a member of the group consisting of hydrogen and the lower alkyls, in sulfuric acid containing not more than about 25% water to temperatures over about 150° C., and holding until conversion is essentially complete.

6. The process for transforming triaminotriphenylmethane dyes into triaminophenylfluorene dye leucos which comprises heating over 150° C. on a transient triaminotriphenylmethane sulfonate whereby rearrangement of this triaminotriphenylmethane sulfonate to a triaminophenylfluorene leucosulfonate occurs, followed by replacement of the leucosulfonic acid group by hydrogen to give the corresponding triaminophenylfluorene, this transformation being brought about in sulfuric acid containing not more than about 25% water.

References Cited

UNITED STATES PATENTS

| | | | |
|---|---|---|---|
| 473,453 | 4/1892 | Epting | 260—391 |
| 647,834 | 4/1900 | Herzberg et al. | 260—391 |

OTHER REFERENCES

Barker et al. (I), J. Chem. Soc., 1953, pp. 2034–2036.
Barker et al. (II), J. Chem. Soc., 1954, pp. 870–873.
Barker et al. (III), J. Chem. Soc., 1954, pp. 1307–1309.
Dutt, J. Chem. Soc., 1926, pp. 1181–1182.

CHARLES B. PARKER, *Primary Examiner.*

LEON ZITVER, *Examiner.*

BRUCE M. EISEN, ROBERT V. HINES,
*Assistant Examiners.*